3,198,251
DEODORANT PREPARATION
Joseph L. Shore, Philadelphia, Pa., assignor to Hart Laboratories, Inc., a corporation of Pennsylvania
No Drawing. Filed Aug. 26, 1960, Ser. No. 52,055
18 Claims. (Cl. 167—22)

The invention is that of a water-dispersible or water-soluble deodorant preparation containing a water-soluble benzethonium quaternary salt as deodorizing constituent and a water-soluble nitrite, and which preparation shows dependable and enhanced deodorizing effectiveness, for example, as in odor elimination and duration of result.

This invention also is that of a water-soluble, relatively non-caking, solid deodorant and disinfecting preparation containing a water-soluble benzethonium quaternary salt as its deodorant constituent, and that of the method of preparing the preparation.

How to overcome the unpleasant, annoying and, at times to many, nauseating odors such as occur about urinals, toilet bowls, lavatories, and in public and even private rest-rooms generally, in garbage containers and collecting areas, in conveyances for transportation of various high water content and readily decomposable foodstuffs such as raw seafood and meats, of livestock, and the like, of hides and other materials that leave uncomfortable and unbearable odors, has been a constantly disturbing and troublesome problem.

Various attempts have been made to overcome that problem such as by washing and scrubbing with various cleansing agents, applying oxidizing agents and/or mere pleasant smelling preparations. However, all of these have been unsatisfactory for various reasons. Among them are cost such as for materials, labor, and time required, need to repeat and repeat the treatment because of its extremely short relief period or because the undesirable odor only is masked. In the latter case then, the masking agent must be constantly present by regular and all too frequent replenishment. Moreover, such odor-masking agents cannot be used where they might be contacted, or their vapors absorbed, by foodstuffs.

In the investigation that resulted in the various features of the invention described herein, it was discovered that benzethonium chloride when dissolved in water and the resulting solution sprayed onto or swished about the odor-emitting area, gave some limited relief.

However, such relief was inadequate and unsatisfactory for at best it was merely short-lived, in that it lasted for only a matter of hours and in a limited way on an occasion for possibly about a day.

The foregoing problems with odors are overcome by deodorizing treatment with the deodorant preparations of the invention. By thus using the deodorant preparations of the invention, it was found that odors can be eliminated and the discomfort therefrom avoided for a matter of days, e.g. for at least from about a few days to as much as about a week and more, and at times for about ten days or so depending on circumstances before further treatment is necessary.

Thus, the invention involves including in the deodorant preparations thereof containing a water-soluble benethonium quaternary salt (e.g. a benzethonium halide as benzethonium chloride), in addition a quantity of a water-soluble nitrite sufficient to enhance the odor elimination of the benzethonium quaternary salt.

The water-soluble benzethonium quaternary salt, and especially a benzethonium halide such as benzethonium chloride, because of its hygroscopic nature, presents a bothersome handling difficulty. That is so because on exposure to humid atmosphere, it tends to cake and pack. It thus presents difficulty in handling and also manifests retarded solubility in water. As a result, benzethonium chloride, for use as a germicidal agent quite regularly is shipped as an aqueous solution, usually concentrated and to be diluted with a directed volume of water to provide the germicidal solution for use.

This is an undesirable disadvantage not only because of the greater expense for shipping the water in which the quaternary ammonium salt is dissolved and also for the more costly and larger shipping container, but also due to the limitation in suitable shipping containers for transportation of the aqueous solution. These and other difficulties and disadvantages are avoided by the solid, relatively non-caking modification of the compositions of this invention.

In its broadest aspect, the invention is that of a deodorant preparation effective to reduce significantly, and even to the extent to eliminate undesirable, odor occurring in areas and originating from liquid to solid materials of human and animal origin, which preparation comprises a water-soluble nitrite sufficient to make significantly effective the deodorizing activity, whereby the area treated with the preparation containing jointly the benzethonium salt and the nitrite has its undesirable odor significantly reduced even to the extent of being eliminated so that any further such treatment of such treated area with deodorant can be deferred for days before the odor again becomes undesirable.

Any water-soluble benzethonium quaternary salt can be used such as that whose anion is that of an inorganic mineral acid, such as a benzethonium halide from a haloacid, as its chloride, bromide, iodide, and fluoride; and its sulfate, phosphate, and nitrate; or whose anion is that of a suitable organic acid, for example, aliphatic acid, as its formate, acetate, propionate, acrylate, crotonylate, lactate, oxalate, and the like.

The water-soluble nitrite can be any alkali metal nitrite such as sodium nitrite, potassium nitrite, and also ammonium nitrite, as well as any alkaline earth nitrite such as calcium nitrite, barium nitrite, strontium nitrite, with magnesium nitrite included among them.

Any deodorant preparation containing the co-acting benzethonium quaternary salt and water-soluble nitrite as embraced by the invention can be admixed with other constituents for other purposes than the deodorizing effectiveness. Thus, for example, the tendency of the mixture of the primarily essential constituents, i.e. the water-soluble benzethonium quaternary salt and nitrite, to cake is retarded, in accordance with another feature of the invention, by admixing with them lactose or both lactose and a water-soluble bicarbonate (e.g. an alkali metal bicarbonate such as sodium bicarbonate and potassium bicarbonate, as well as ammonium bicarbonate).

For example, such a preparation with retarded tendency to cake can have these constituents admixed roughly in the proportions (i) of about three parts of the water-soluble benzethonium quaternary salt to about four parts of the water-soluble nitrite to about one part of lactose, or (ii) these same three ingredients in about such same proportions as just recited and also about four parts of the water-soluble bicarbonate. By "roughly in the proportions of about" is intended to allow a variation of about plus or minus ten percent in the number of parts of each of the individual ingredients.

The invention includes also the method of preparing the latter modification of the preparations embraced by it. This method in general comprises agglomerating or granulating the benzethonium salt, the alkali-cation nitrite, and roughly about half of the lactose, with the minimum amount of water needed to let them be granulated, then drying the agglomeration or granulation; and then admixing it with the alkali-cation carbonate and the balance of the lactose, preferably after similarly agglomerating or granulating them and drying such granulation.

More specifically, the benzethonium salt, the alkali-cation nitrite, and roughly about half of the lactose are relatively uniformly admixed. Then their mixture is wetted with the very minimum amount of water required to moisten them sufficiently to enable them to be agglomerated or granulated on being tumbled about in a granulator drum. Roughly from about a gallon to about five quarts of water per two hundred pounds of mixture of those three noted ingredients can be sufficient. The granulation then is dried, for example, in a shelf drier, long enough to evaporate substantially all, or all, of the added water. The granulation then is broken down or disintegrated, for example, by passing it through a vibrating screen of suitable mesh such as a No. 10 screen, and admixed with the bicarbonate and the balance of the lactose, preferably after similarly agglomerating or granulating them and drying such granulation.

The retarded caking form of the invention is illustrated by, but not restricted to, the following:

*Example 1.*—Seventy-nine pounds of benzethonium chloride monohydrate were admixed with one hundred and six pounds of sodium nitrite, and thirteen pounds of lactose in an ordinary finely divided solids mixer, and mixed uniformly well for about fifteen minutes. Then a gallon or even five quarts of water were added and the mixing continued until the water was evenly distributed throughout the mixture of solids. The thus agglomerated or granulated admixture then was dried for nine hours until it was free from moisture. The dried granulated admixture then was removed from the drier and passed through a vibrating No. 10 screen and fed to a mixer. To it there were added one hundred and four pounds of a dried similar granulation of sodium bicarbonate and fourteen pounds of lactose; and both said granulations of these materials then were mixed for about fifteen minutes, and then drummed.

In the foregoing example, the sodium bicarbonate can be replaced by the corresponding equivalent amount of any other alkali metal bicarbonate, such as potassium bicarbonate, or by ammonium bicarbonate.

While Example 1 is embraced by, and thus also illustrates, the invention in its broad scope as a water-soluble or -dispersable deodorant preparation comprising a water-soluble benzethonium quaternary salt and the water-soluble nitrite that co-acts with it, the invention in its broad scope also is illustrated, but not restricted to, the following:

*Example 2.*—Five hundred pounds of benzethonium chloride monohydrate were added to six hundred and seventy-five pounds of sodium nitrite, and the two substances were mixed for about fifteen minutes to a uniform mixture. The mixture then is subdivided into market package quantities, e.g. one hundred and seventy pound portions and twenty-five pound portions, and filled into respectively corresponding size polyethylene liners and thus packed, for example, in the proper size fibre drums.

It is beneficial to pack the mixture of Example 1 similarly.

In any of the specific examples, the benzethonium chloride can be replaced by the corresponding equivalent amount of any other applicable water-soluble benzethonium quaternary salt whether broadly disclosed or specifically referred to herein, such as any of those mentioned at column 2, lines 28 through 35, hereof.

The water-soluble nitrite of either of the examples or any ingredient substitution modifications thereof can be replaced by the corresponding equivalent amount of some other alkali metal nitrite, for example, potassium nitrite, or by ammonium nitrite.

It is not necessary that merely a single benzethonium quaternary salt, or a single nitrite, be used in any preparation embraced by the invention. The respective quantity of either or both the quaternary salt and the nitrite can be made up from more than one of each of them respectively. The same applies to the bicarbonate.

The mixing time, in any mixing step, is not restricted to fifteen minutes. The mixing should be for at least a time to attain practically uniform admixture of the substances. The drying of any mixture or agglomeration or granulation of the benzethonium salt with the nitrite and also with the lactose need be sufficient only to drive off the moisture in the mixture of these respective various ingredients. It can be less than nine hours, even about eight hours, and in some instances somewhat less, and some times as much as about twelve hours.

If any part of the benzethonium salt, or of the nitrite, or of the bicarbonate or lactose is caked before use, such part of any of them that is caked can be disintegrated, for example, on a vibrating screen, with paddling if necessary to break down initially resistant lumps.

While each of the benzethonium salt, the nitrite, and the bicarbonate ordinarily is hygroscopic and cakes on too long exposure to moisture, the composition containing the three of them and lactose to the extent of less than about ten percent of their total is relatively non-caking.

Benzethonium chloride is more specifically diisobutyl-phenoxyethyl dimethyl benzyl ammonium chloride. When dissolved in water, it ionizes with chlorine as anion and the rest of the molecule as cation. Thus, in each other benzethonium quaternary salt applicable in the preparations of the invention, the cation is the same, and the anion only is different.

As a further aspect of the invention, there is involved the preparation of benzethonium nitrite and its effectiveness as a deodorant agent. Thus, the preparation of Example 1, for example, can be dispersed with stirring in the minimum amount of water that appears to have dissolved the quantity taken. Part of the resulting dispersion is set aside to stand without stirring. The rest can be used as a deodorizing solution, preferably by dilution to the equivalent of about six ounces (by weight) of the original composition per gallon of water, and used in the same manner in which any preparation of the invention is used.

After the portion of the concentrated aqueous dispersion, which was set aside, has stood for a sufficient time, a yellow oily material is found to have separated on top of the aqueous phase. On removing this yellow oily material and letting it stand, it crystallizes in time. Recrystallization of these crystals from ethyl acetate yields a crop of lighter crystals melting at 157–159° C. Analysis indicates it to be benzethonium nitrite, thus

|  | Carbon | Hydrogen | Nitrogen |
| --- | --- | --- | --- |
| Calculated | 69.57 | 9.23 | 6.11 |
| Found | 70.30 | 9.28 | 5.74 |

The compositions of the invention are useful as deodorizing preparations. Applied in aqueous dispersion or solution to areas to be treated they are effective to eliminate organic odors such as occur in urinals, toilet bowls, lavatories generally, and public rest-rooms, or damp floors and other areas such as those mentioned at column 1, lines 20–26, hereof, and ordinarily prevent further odor development for days and even as much as a week or more. The preparations can be used for those and other applications in aqueous solutions, for example, of about six ounces (by weight) of the mixture dissolved in a gallon of water, or other suitable concentration, and applied by spraying, brushing, rinsing, mopping and otherwise to the areas concerned. They are effective even in hard water and are non-corrosive, for example, to ferrous metals.

For some uses and in certain areas, such as in many large cities, these compositions, for example, that of Example 1, can be used after the dried agglomerate or granulate is passed through the vibrating screen. In that form the composition contains the finely divided agglomerates of the benzethonium salt, the nitrite, and the lactose, and in proportions roughly about six parts of the benzethonium salt to about eight parts of the nitrite to about one part of the lactose.

In situations wherein the conditions from which the odor originally developed do not re-occur, once eliminated by use of the preparation of this invention, the odor cannot be expected to reappear because the mechanism is not a mere masking of the odor.

While the invention has been explained by detailed description of certain specific embodiments of it, it is understood that various modifications and substitutions can be made within the scope of the appended claims which are intended also to include equivalents of the specific embodiments.

This application is a continuation-in-part of my co-pending application Serial No. 573,620, filed March 26, 1956, and now abandoned.

What is claimed is:

1. A water-dispersible deodorant mixture containing a water-soluble benzethonium quaternary salt and a member of the class consisting of an alkali metal nitrite and ammonium nitrite, which mixture after dispersion in water, provides by inter-action between its said quaternary salt and nitrite an oily material over the surface of said dispersion of the mixture; and said aqueous dispersion as applied adequately over an area which thereunto manifested undesirable organic odor, serves to rid the area of such odor to an extent sufficient to last for days before a subsequent application of said dispersion may be needed.

2. A deodorant preparation as claimed in claim 1, wherein the benzethonium salt is a halide.

3. A deodorant preparation as claimed in claim 2, wherein the benzethonium salt is the chloride.

4. A deodorant preparation as claimed in claim 2, wherein the nitrite is an alkali metal nitrite.

5. A deodorant preparation as claimed in claim 2, wherein the nitrite is sodium nitrite.

6. A deodorant preparation as claimed in claim 2, wherein the benzethonium salt is a halide and the nitrite is an alkali metal nitrite.

7. A water-dispersible, relatively non-caking deodorant preparation containing a benzethonium quaternary salt, lactose, and a nitrite member of the class consisting of the alkali metal and alkaline earth metal nitrites and ammonium nitrite.

8. A deodorant preparation as claimed in claim 7, wherein the named constituents are present roughly in the proportions of about six parts of the benzethonium salt, to about eight parts of the nitrite to about one part of lactose.

9. A deodorant preparation as claimed in claim 7, which contains also a bicarbonate member of the class consisting of an alkali metal bicarbonate and ammonium bicarbonate.

10. A deodorant preparation as claimed in claim 9, wherein the constituents are present roughly in the proportions of about three parts of the benzethonium salt, to about four parts of the nitrite, to about four parts of the bicarbonate, to about one part of lactose.

11. A deodorant preparation as claimed in claim 10, wherein the benzethonium salt is a halide.

12. A deodorant preparation as claimed in claim 11, wherein the nitrite is an alkali metal nitrite and the bicarbonate is an alkali metal bicarbonate.

13. A deodorant preparation as claimed in claim 12, wherein the benzethonium salt is benzethonium chloride, and the nitrite is sodium nitrite, and the bicarbonate is sodium bicarbonate.

14. A water-dispersible, relatively non-caking deodorant preparation containing about six parts of benzethonium chloride, about eight parts of sodium nitrite, and about one part of lactose.

15. A water-dispersible, relatively non-caking deodorant preparation containing about three parts of a benzethonium halide, about four parts of an alkali metal nitrite, about four parts of an alkali metal bicarbonate, and about one part of lactose.

16. A water-dispersible, relatively non-caking deodorant preparation containing about three parts of benzethonium chloride, about four parts of sodium nitrite, about four parts of sodium bicarbonate, and about one part of lactose.

17. The method of preparing a water-dispersible, relatively non-caking deodorant preparation containing a water-soluble benzethonium quaternary salt, a nitrite member of the class consisting of an alkali metal and alkaline earth metal nitrite and ammonium nitrite, and lactose, which method comprises admixing the benzethonium salt, the nitrite, and the lactose; and evenly distributing through the admixture thereof enough water to moisten it sufficiently to enable it to be loosely granulated; tumbling the thus moistened admixture to form loose granulations of it; and drying the resulting granulation to drive off its moisture.

18. A water-dispersible deodorant mixture containing a water-soluble benzethonium quaternary salt and a member of the class consisting of an alkali metal nitrite and ammonium nitrite, wherein the nitrite exceeds the benzethonium salt by weight and they are in the proportion of about three parts of the benzethonium salt to about four parts of the nitrite; which mixture after dispersion in water, provides by inter-action between its said quaternary salt and nitrite an oily material over the surface of said dispersion of the mixture; and said aqueous dispersion as applied adequately over an area which thereunto manifested undesirable organic odor, serves to rid the area of such odor to an extent sufficient to last for days before a subsequent application of said dispersion may be needed.

References Cited in the file of this patent

UNITED STATES PATENTS

| 2,155,326 | O'Brien | April 18, 1939 |
| 2,446,792 | Shelton | Aug. 10, 1948 |
| 2,541,248 | Hibbs | Feb. 13, 1951 |
| 2,702,774 | Stayner | Feb. 22, 1955 |

OTHER REFERENCES

Lawrence: Surface Active Quaternary Ammonium Germicides, Academic Press Inc., New York, 1950, pp. 20, 22, 25.

The Merck Index, 6th ed., Merck and Co., Inc., Rahway, N.J., 1952, p. 735.

Silver et al.: Manuf. of Compressed Tablets, F. J. Stokes Machine Co., 1944, pp. 3–5, 10–17 and 20–23.

Clarkson: Tablet Coating, D. and C. Ind., New York, 1951, pp. 53 and 62.

Botwright: J. Soc. Cos. Chemists 3:2, August 1952, pp. 118–123.

Little et al.: Tablet Making, The Northern Pub. Co., Ltd., Liverpool, England, 1949, pp. 30–34, 37–41.

MORRIS O. WOLK, *Primary Examiner.*

FRANK CACCIAPAGLIA, JR., *Examiner.*